(12) United States Patent
Cornelissen et al.

(10) Patent No.: US 8,016,100 B2
(45) Date of Patent: Sep. 13, 2011

(54) MODULE FOR A CONVEYOR MAT, MODULAR CONVEYOR MAT AND CONVEYOR

(75) Inventors: Leonardus Adrianus Catharinus Cornelissen, Gravenzande (NL); Gijsbertus Johannes Verduijn, Terheijden (NL)

(73) Assignee: Rexnord Flattop Europe B.V., 'S-Gravenzande (NL)

( * ) Notice: Subject to any disclaimer, the term of this patent is extended or adjusted under 35 U.S.C. 154(b) by 0 days.

(21) Appl. No.: 12/097,698

(22) PCT Filed: Dec. 19, 2006

(86) PCT No.: PCT/NL2006/000642
§ 371 (c)(1),
(2), (4) Date: Sep. 2, 2008

(87) PCT Pub. No.: WO2007/073161
PCT Pub. Date: Jun. 28, 2007

(65) Prior Publication Data
US 2009/0194388 A1    Aug. 6, 2009

(30) Foreign Application Priority Data
Dec. 19, 2005  (NL) ..................................... 1030701

(51) Int. Cl.
*B65G 23/06* (2006.01)
(52) U.S. Cl. ....................................... 198/834; 198/853
(58) Field of Classification Search .................. 198/834, 198/853
See application file for complete search history.

(56) References Cited

U.S. PATENT DOCUMENTS

| | | | | |
|---|---|---|---|---|
| 1,966,659 A | * | 7/1934 | Wynne et al. | 198/853 |
| 4,069,911 A | | 1/1978 | Ray | |
| 4,615,343 A | * | 10/1986 | Komossa | 131/111 |
| 4,865,183 A | * | 9/1989 | Hodlewsky et al. | 198/834 |
| 4,941,568 A | * | 7/1990 | Lapeyre | 198/853 |
| 4,974,724 A | * | 12/1990 | Lapeyre | 198/853 |
| RE34,688 E | * | 8/1994 | Lapeyre | 198/834 |
| 5,566,817 A | * | 10/1996 | Meeker | 198/848 |
| 5,706,934 A | | 1/1998 | Palmaer et al. | |
| 6,196,381 B1 | * | 3/2001 | Kato et al. | 198/853 |
| 6,305,530 B1 | | 10/2001 | Guldenfels | |

(Continued)

FOREIGN PATENT DOCUMENTS

| | | |
|---|---|---|
| DE | 1 044 707 | 11/1958 |
| EP | 0 503 333 | 9/1992 |
| EP | 0 792 822 | 9/1997 |

(Continued)

OTHER PUBLICATIONS

The International Search Report corresponding to PCT/NL2006/000642 under date of mailing of Mar. 21, 2007.

*Primary Examiner* — Joseph A Dillon, Jr.
(74) *Attorney, Agent, or Firm* — Quarles & Brady LLP (57) ABSTRACT

A conveyor, comprising a modular conveyor mat (2) driven by sprocket wheels (19), wherein the conveyor mat is driven by the sprocket wheel on the hinge pins (9). The modular conveyor mat comprises a number of modules (1) successive in conveying direction, which are each provided with a body part extending transversely to the conveying direction and having rows of hinge loops (6) reaching forward and rearward in the conveying direction, wherein the hinge loops of successive modules cooperate and are coupled using hinge pins.

9 Claims, 8 Drawing Sheets

U.S. PATENT DOCUMENTS

| | | | |
|---|---|---|---|
| 6,412,625 B2 * | 7/2002 | Damkjaer | 198/834 |
| 6,481,567 B2 * | 11/2002 | Layne et al. | 198/834 |
| 6,536,583 B2 * | 3/2003 | Luigi | 198/832 |
| 6,758,329 B1 | 7/2004 | Damkjaer et al. | |
| 6,766,899 B1 * | 7/2004 | Guldenfels | 198/834 |
| 7,624,858 B2 * | 12/2009 | Delair et al. | 198/778 |
| 2002/0011401 A1 | 1/2002 | Damkjaer | |

FOREIGN PATENT DOCUMENTS

| | | |
|---|---|---|
| EP | 1 264 786 | 12/2002 |
| EP | 1 270 454 | 1/2003 |
| WO | 2005/115883 | 12/2005 |
| WO | 2006/118446 | 11/2006 |
| WO | 2007/073161 | 6/2007 |

* cited by examiner

MODULE FOR A CONVEYOR MAT, MODULAR CONVEYOR MAT AND CONVEYOR

The invention relates to conveyors with modular conveyor mats, to modular conveyor mats and to modules for modular plastic conveyor mats formed by rows of plastic mat modules hingedly coupled by means of hinge pins.

DE 1044707 discloses a chain band that is driven on the hinge pins via interspaces between the chain links.

U.S. Pat. No. 5,706,934 discloses a modular conveyor mat that is driven on the hinge loops by a sprocket wheel.

As they are light-weight, do not corrode and are relatively easy to clean, modular plastic conveyor mats are widely used, inter alia in conveying food products. Modular plastic conveyor mats are often built up from molded plastic modular connecting elements, called mat modules, which can be placed side by side in rows of the desired width. Rows of spaced-apart hinge loops extend along opposite sides of the modules. The rows of hinge loops are provided with aligned hinge holes for receiving a hinge pin. The hinge loops along one side of a row of modules are then connected to the hinge loops of a side of an adjacent row of modules, for instance as the pattern of fingers of interlacing hands. A hinge pin received in the aligned hinge holes usually forms a hinge joint between adjacent rows. Rows of modules are mostly connected with each other to form an endless conveyor mat which can pass around return wheels.

To drive the mat, typically, drive wheels are provided which engage driving locations of the modules. A problem presenting itself in modular mats is providing driving locations on the modules that limit the utility of the modules as little as possible. In particular, it is difficult to provide a driving location that guarantees a good force transmission, allows proper cleaning and enables the conveyor mat formed with the modules to cooperate with already existing conveyor tracks and driving provisions included therein. With mats having a relatively small pitch between the hinge pins, for instance a pitch of less than 1", lack of space makes it still more difficult to provide a suitable driving location. To reduce this problem, the invention provides a conveyor having a conveyor mat driven directly on hinge pins.

By driving the conveyor mat directly on the hinge pins, use is made of a new driving location which creates many extra possibilities. In particular, driving the pins requires little space, so that mats with a pitch of less than 1" can be driven relatively easily.

Preferably, the conveyor mat is driven using a sprocket wheel which engages the hinge pins at the location of interspaces present transversely to the conveying direction between hinge loops or parts of hinge loops, which interspaces render the hinge pin accessible for cooperation with the teeth of the sprocket wheel.

By providing a module for a modular conveyor mat with opposite, staggered rows of hinge loops with hinge holes situated eccentrically between inner and outer driving faces, the module can be driven at two locations on the hinge loops, so that a good force transmission can be combined with a good cleanability of the module and a good deployability of the module. In particular, the outer driving faces can be optimized for cooperation with a first type of drive wheel, whose teeth can be received laterally between the side surfaces of two adjacent hinge loops of a successive module, in particular the teeth of a sprocket wheel having six to twelve teeth. The inner driving faces can be optimized for cooperation with teeth of another type of drive wheel, for instance a drive wheel which cooperates with the inner driving faces of several hinge loops successive transversely to the conveying direction, and/or for instance a drive wheel with twelve or more teeth, in particular a sprocket wheel carried by the shell of a drum motor.

The invention also relates to a modular conveyor mat.

Further advantageous embodiments of the invention are represented in the subclaims and will be elucidated on the basis of exemplary embodiments represented in a drawing. In the drawing:

It is noted that the Figures are only schematic representations of a preferred embodiment of the invention, which is described by way of non-limitative exemplary embodiment. In the Figures, identical or corresponding parts are designated with the same reference numerals.

Figure 1:
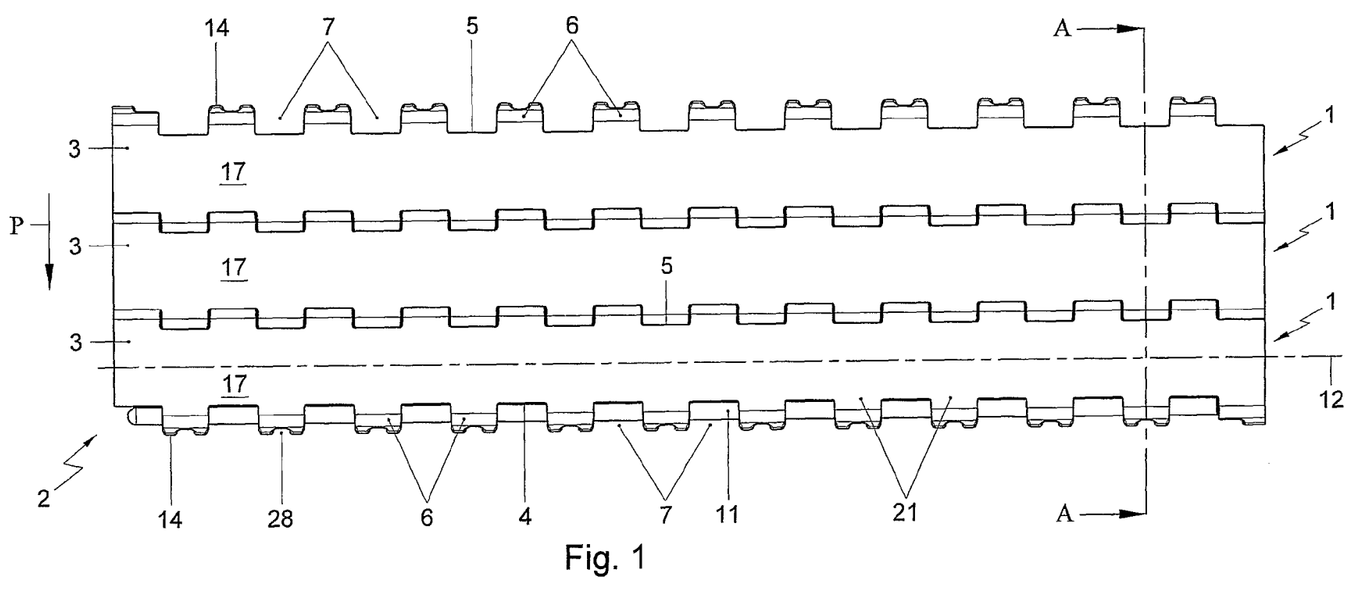
FIG. 1 shows a schematic top plan view of a conveyor mat according to the invention.
Figure 2:
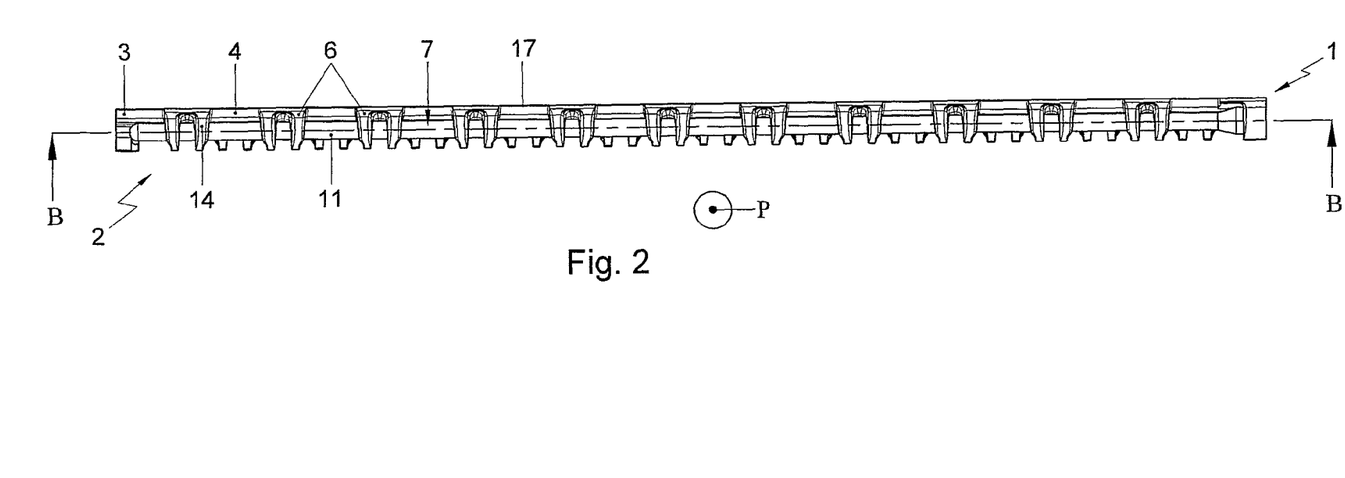
FIG. 2 shows a schematic front view of the conveyor mat of FIG. 1.
Figure 3:
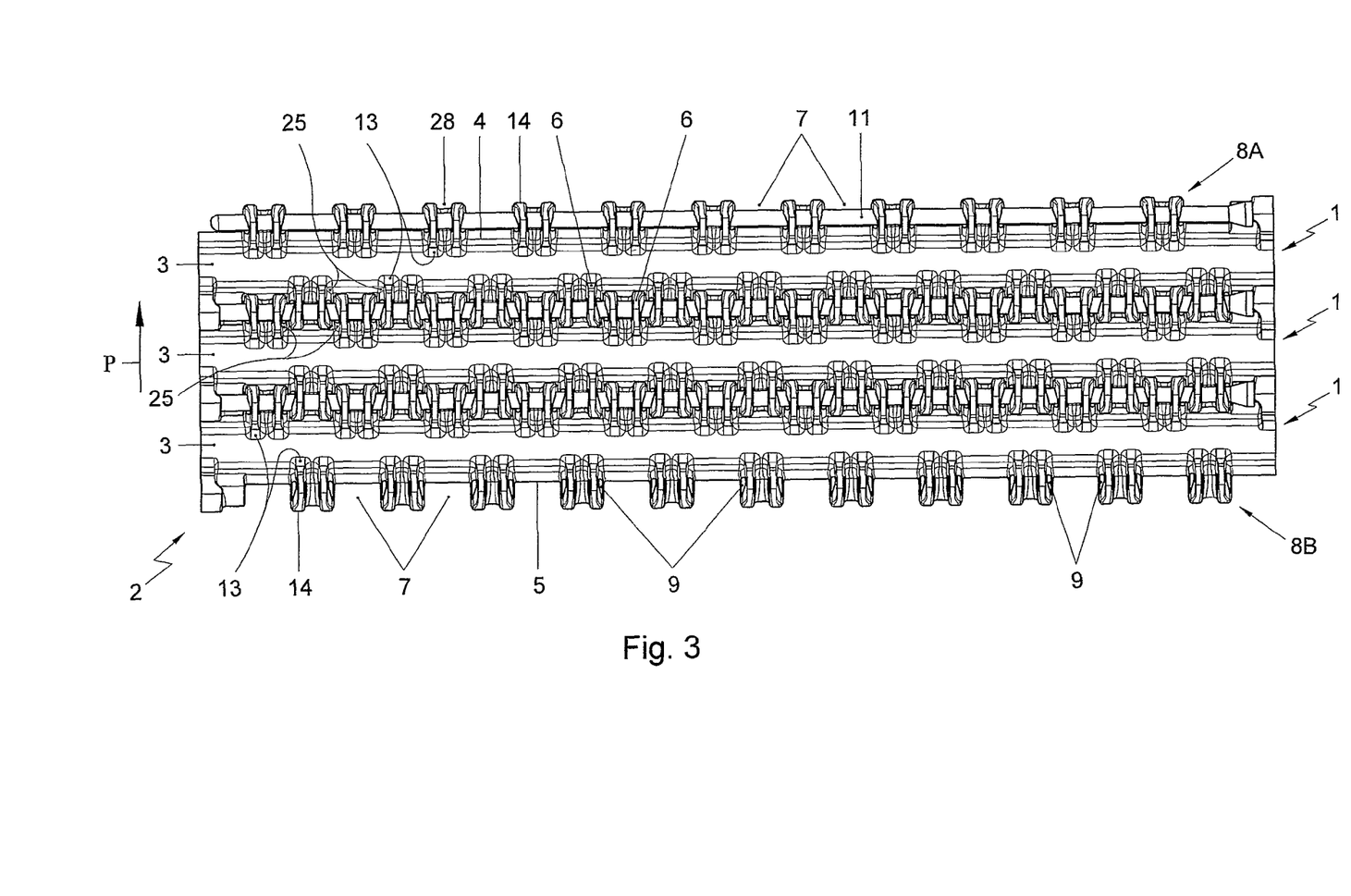
FIG. 3 shows a schematic bottom view of the conveyor mat of FIG. 1.
Figure 4:
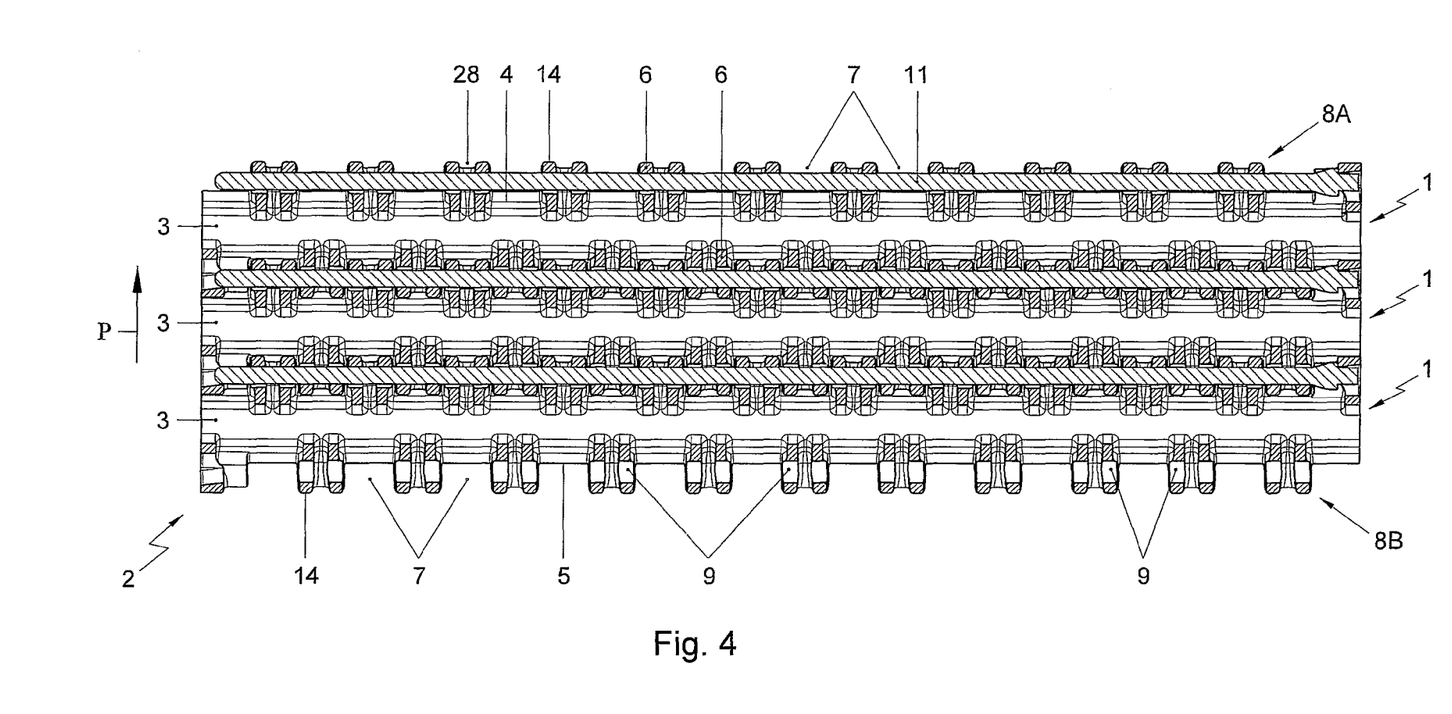
FIG. 4 shows a schematic bottom view of the conveyor mat of FIG. 1, cross-sectioned along the line B-B in FIG. 2.
Figure 5:
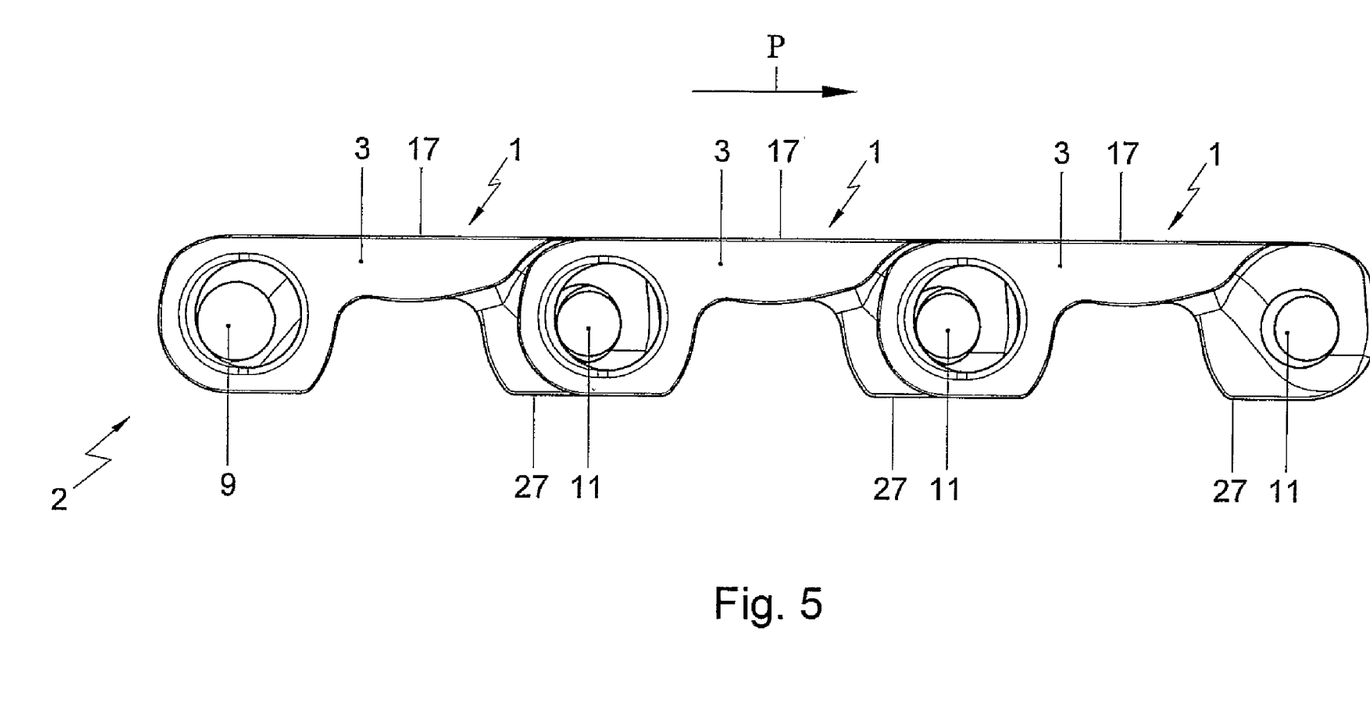
FIG. 5 shows a schematic side view of the conveyor mat of FIG. 1.

Referring to FIGS. 1-6, there is shown a module 1 which is included in a part of a conveyor mat 2. The module 1 comprises a body part 3 which, on a front side 4 and a rear side 5 operatively extending transversely to a conveying direction indicated with an arrow P, is provided with rows of hinge loops 6. Transversely to the conveying direction P, the hinge loops 6 are spaced apart with mutual interspaces 7. As indicated in FIGS. 3 and 4, the hinge loops 6 of the front row 8A are staggered transversely to the conveying direction relative to the hinge loops 6 of the back row 8B.

The hinge loops 6 are provided with hinge holes 9, extending transversely to the conveying direction P, which are aligned per row.

The front sides 4 and the rear sides 5 of the successive modules are coupled by means of a hinge pin 11 extending transversely to the conveying direction P. The hinge loops 6 then interlock like the fingers of two interlacing hands.

Figure 6:
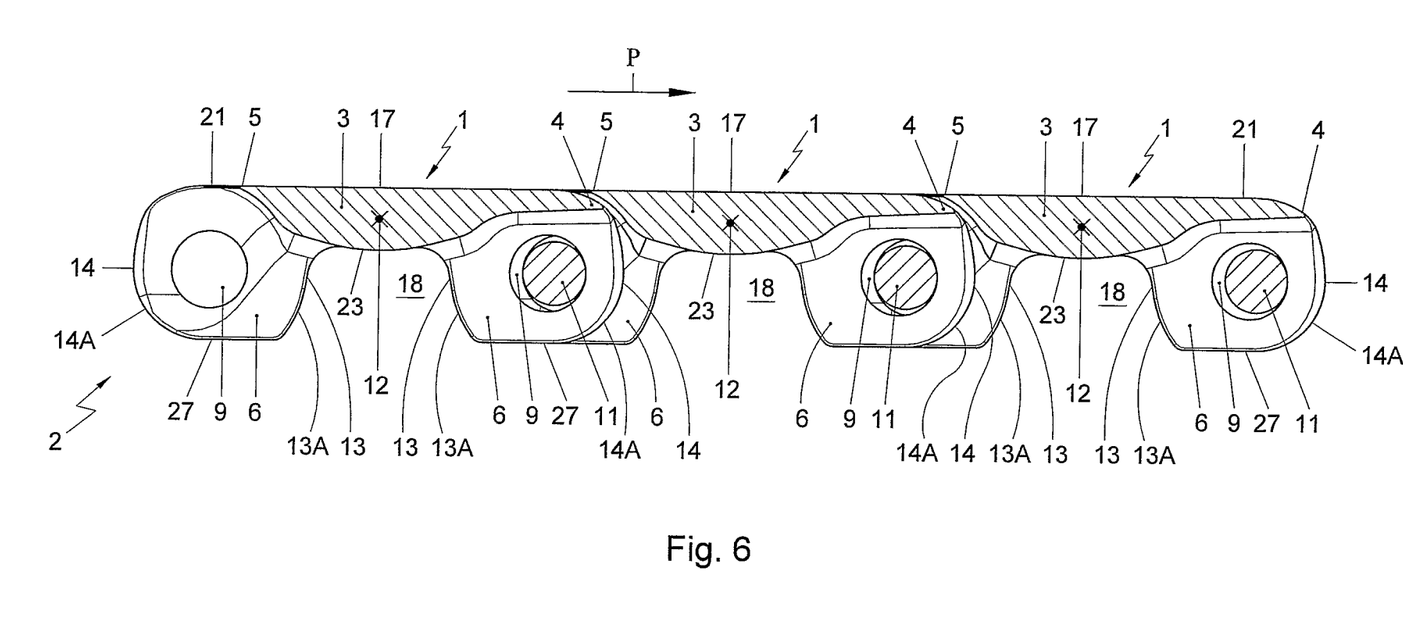
FIG. 6 shows a schematic cross-section of the mat of FIG. 1 along the line A-A in FIG. 1.

The hinge loops 6 extend from inner faces 13 situated nearer to the centerline 12 of the module 1, represented in FIG. 6, to outer faces 14 situated further away from the center line and located on the front side 4 or the rear side 5, respectively, of the module 1.

Here, the outer faces 14 are situated nearer to the hinge holes 9 than the inner faces 13.

The inner faces 13 are provided with inner driving faces 13a for cooperation with the teeth of a first type of drive wheel 15. The outer faces 14 are provided with outer driving faces 14a for cooperation with the teeth of a drive wheel 16 of a second type.

The inner driving faces 13a and the outer driving faces 14a have a substantially curved configuration: the driving faces are curved relative to an axis of curvature A1 or A2, respectively, extending substantially transversely to the conveying direction. This axis of curvature is formed by the central axis of the hinge pin 11 when this abuts against the edge of the hinge loop 6 contiguous to the driving face.

The curvature of the outer driving faces 14a is stronger than the curvature of the inner driving faces: the radius of curvature R1 of the outer driving faces 14a is smaller than the radius of curvature R2 of the inner driving faces 13a.

The body part 3 is substantially of sheet-shaped design. The hinge loops 6 extend downward relative to the conveying surface 17 of the module, and forward or rearward in conveying direction relative to the centerline 12 of the module.

The conveying surface 17 on the top side of the body part 3 of the modules 1 has a substantially planar configuration and is of closed design. The bottom side 23 of the body part 3, viewed transversely to the conveying direction, has a substantially belly-shaped configuration.

The conveying surface 17 links up in a substantially plane manner with the closing surfaces formed by back parts 21 of the hinge loops 6. Consequently, when successive modules 1 are situated in a flat plane, their conveying surfaces 17 form a closed conveying surface.

In FIGS. 2 and 6 it is clearly visible that the bottom side 23 of the body part is reduced adjacent the side edge, at least at the location of an interspace 7 situated between the hinge loops 6. Between the inner driving faces 13A, further, a free space 18 is present. This free space enhances the cleanability of the bottom side of the module.

Figure 7:
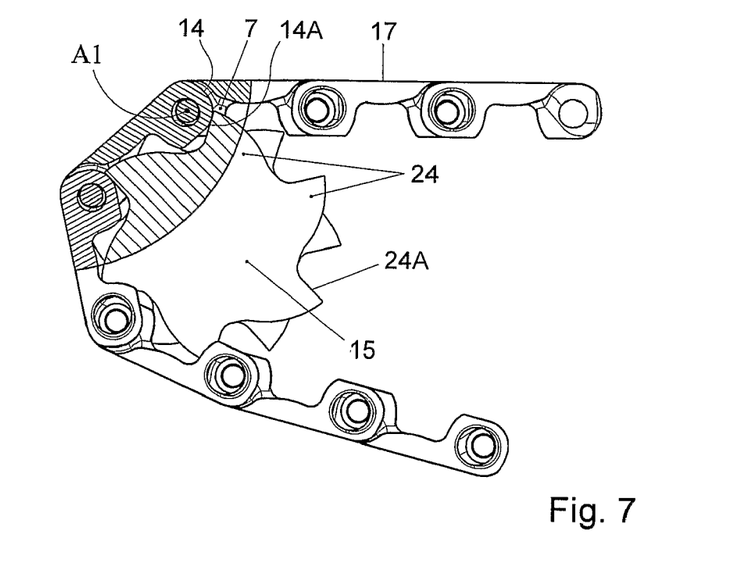
FIG. 7 shows a schematic side view of a detail of a first type of drive wheel which cooperates with an outer driving face of the module.

In FIG. 7, a first type of drive wheel 15 is shown, of which a tooth 24 cooperates with an outer driving face 14A of the module 1. In this exemplary embodiment, this drive wheel has six teeth 24, uniformly distributed along the circumference. The teeth 24 can be received between side surfaces 25 of two adjacent hinge loops 6 of a successive module 1. The teeth 24 each have a driving flank 24A and are for driving in one conveying direction. The sprocket wheel 15 can also be provided with an equally large set of mirrored teeth, staggered transversely to the conveying direction, for driving in the opposite direction. It is clearly visible in the Figure that the reduced interspace 7 renders the outer driving face 14A well accessible to the tooth 24, and that as a result, the outer driving face 14A, when passing around, can be cleaned well from the conveying surface 17.

Figure 8:
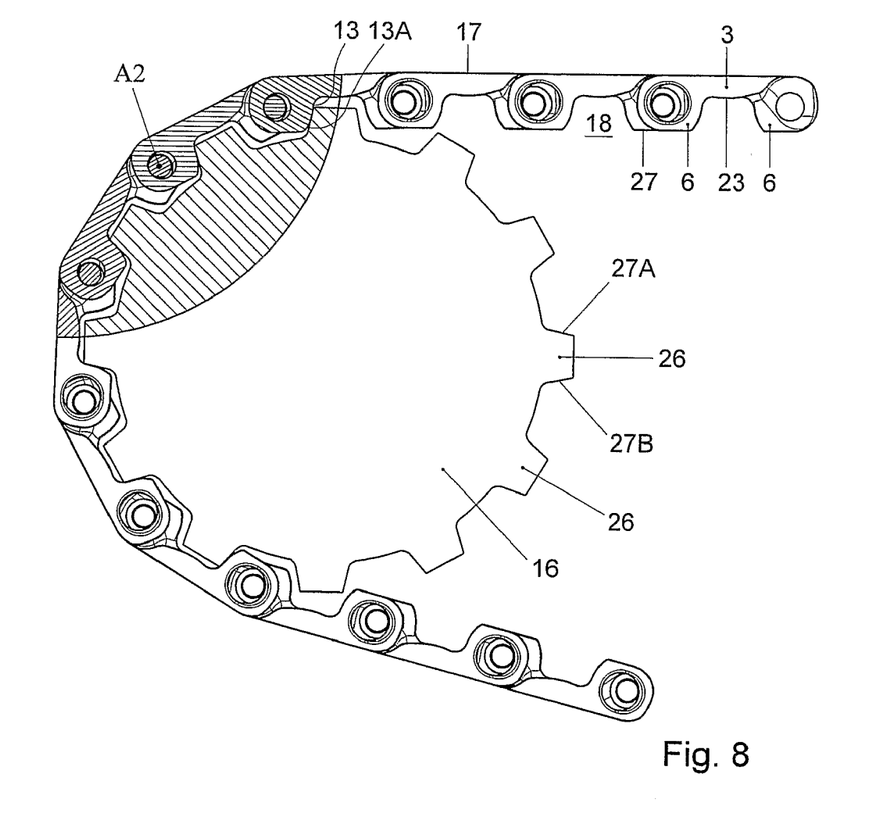
FIG. 8 shows a schematic side view, in detail, of teeth of a second type of drive wheel which cooperates with inner driving faces of the modules.

In FIG. 8, a second type of drive wheel 16 is shown, which cooperates with the inner driving faces 13A of the modules 1. In contrast with the first type of drive wheel, of which the width of the teeth 24 corresponds to the width transverse to the conveying direction of an outer driving face 14A, the width of the teeth 26 of this second type of drive wheel 16 corresponds to the width of a plurality of inner driving faces 13A. The second type of sprocket wheel 16 can, for instance, be a sprocket wheel carried by the shell of a drum motor and having a relatively large diameter, and which is provided with, for instance, twelve teeth. This Figure clearly shows that the free space 18 can also be utilized for receiving a relatively large tooth 26. Such a tooth can be provided with driving flanks 27A, B on both sides for driving in two opposite directions.

At least a part of the hinge loops 6 is provided with a groove 28, extending in conveying direction P, reaching into the hinge hole 9. This groove extends from the bottom side 27 of the hinge loop 6 in the direction of the conveying surface 17, to a point spaced from the conveying surface. In this exemplary embodiment, the groove 28 extends as far as the bottom side 23 of the body part 3.

Figure 9:
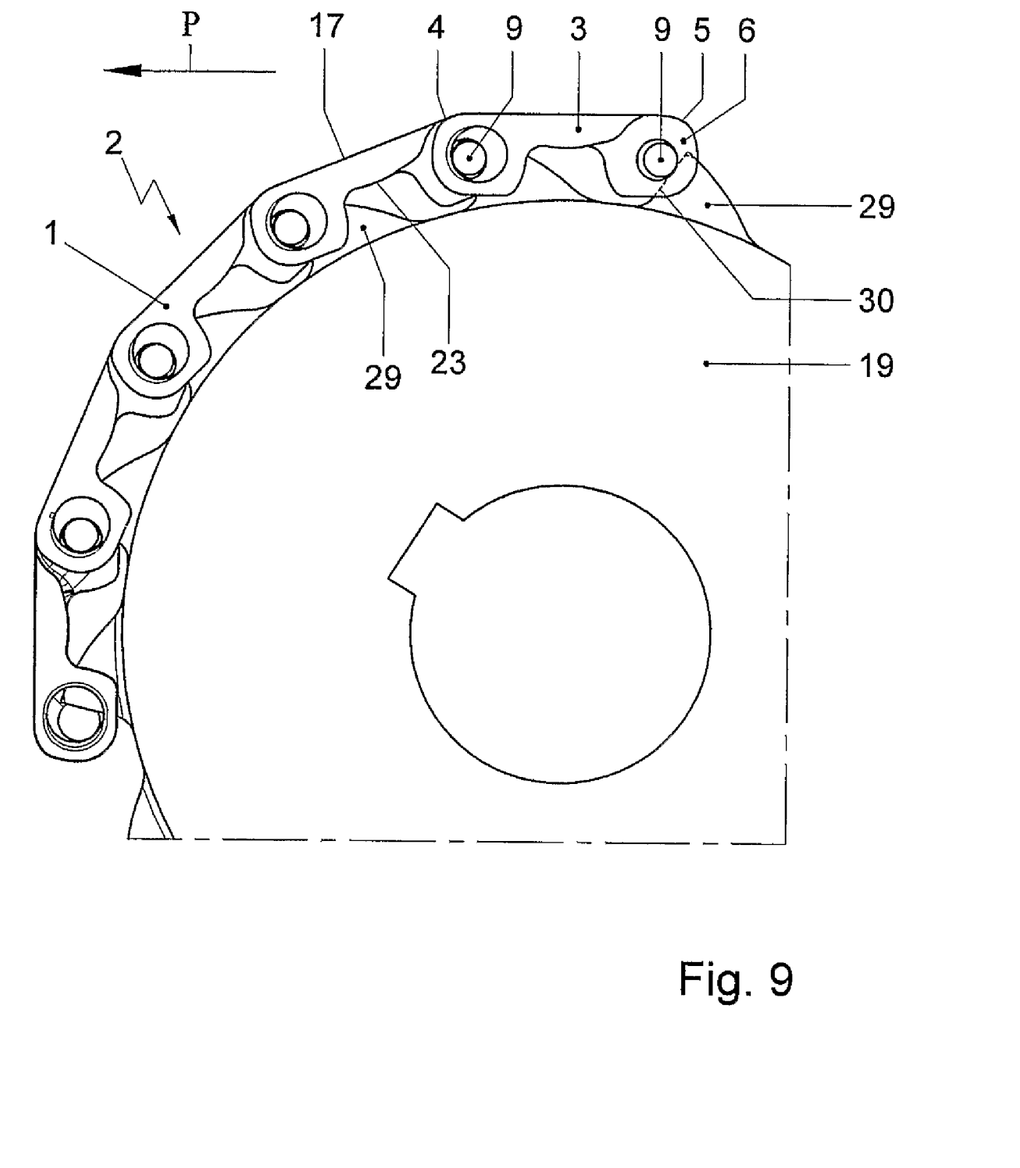
FIG. 9 shows a schematic side view of a third type of drive wheel, whose teeth cooperate with hinge pins of a conveyor mat.
Figure 10:
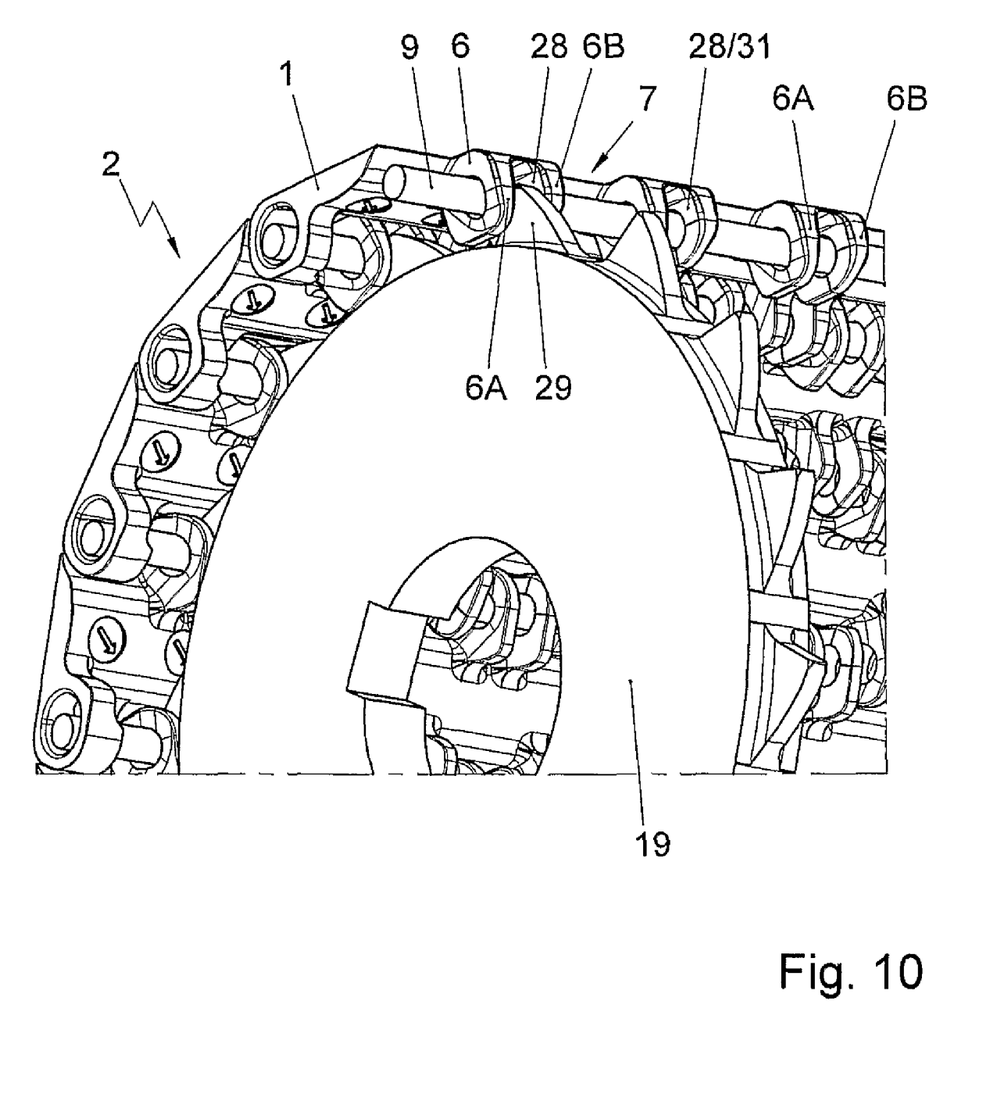
FIG. 10 shows a schematic perspective view of the modular conveyor mat of FIG. 9 which is driven with the sprocket wheel by way of the hinge pins.

FIGS. 9 and 10 show a conveyor, comprising a modular conveyor mat 2 driven by a sprocket wheel 19 of a third type. The conveyor mat 2 is driven by the sprocket wheel 19 on the hinge pins 9. The modular conveyor mat 2 comprises a number of modules 1 successive in conveying direction P. The modules 1 are each provided with a body part 3 extending transversely to the conveying direction. At the front side 4, the body part 3 is provided with hinge loops 6 extending forward in the conveying direction. Further, at the rear side 5, the body part 3 is provided with hinge loops 6 extending rearward in the conveying direction. The hinge loops 6 of successive modules 1 in the conveying direction P cooperate and are coupled using hinge pins 9.

The flanks 30 of the teeth 29 of the sprocket wheel 19 engage the hinge pins 9 at the location of interspaces 31 present transversely to the conveying direction P between hinge loops 6. The interspaces 31 render the hinge pin 9 accessible for cooperation with the teeth 29 of the sprocket wheel 19.

The sprocket wheel 19 cooperates with the hinge pins 9 at the location of the underside 23 of the mat 2 remote from the conveying surface 17. In this exemplary embodiment, the interspaces 31 are situated between loop parts 6A, 6B of the same module 1 that are successive transversely to the conveying direction P. The interspace 31 here corresponds to a groove 28 extending in conveying direction, which is provided in the hinge loop 6 and which extends into the hinge hole.

The interspaces 31 may also be situated between hinge loops 6 of two modules 1 adjacent to each other transversely to the conveying direction P. This can be done, for instance, by choosing the interspace 7 between the hinge loops 6 to be greater than the width of the hinge loop 6 transversely to the conveying direction P.

The interspaces 31 may also be situated between hinge loops 6 of successive modules 1 in conveying direction P that are coupled via a hinge pin 9.

It will be clear that the invention is not limited to the exemplary embodiments represented here. For instance, the body part of the module may be designed to be at least partly open, for instance as a so-called flush grid mat module, and/or it may for instance have a sinuous, wavy, zigzag, grid or spine shape. Further, the conveying surface may be of non-planar design, for instance concave, convex and/or corrugated. Such variants will be clear to those skilled in the art and are understood to fall within the scope of the invention as represented in the following claims.

The invention claimed is:

1. A conveyor, comprising a modular conveyor mat driven by at least one sprocket wheel, wherein the modular conveyor mat comprises a number of modules successive in a conveying direction and transverse to said conveying direction, which are each provided with a body part extending transversely to the conveying direction and having rows of a plurality of hinge loops respectively reaching forward and rearward in the conveying direction, the hinge loops being spaced apart transversely to the conveying direction defining first gaps between adjacent hinge loops, wherein the hinge loops of successive modules are received in said first gaps and are coupled using hinge pins, and wherein the conveyor mat is driven by the sprocket wheel on the hinge pins extending across second gaps formed in at least one of said adjacent hinge loops of said successive modules.

2. A conveyor according to claim 1, wherein teeth of the sprocket wheel engage the hinge pins at the location of the second gaps, which the second gaps render the hinge pin accessible for cooperation with the teeth of the sprocket wheel.

3. A conveyor according to claim 1, wherein the sprocket wheel cooperates with the hinge pins at the location of the underside of the mat remote from the conveying surface.

4. A conveyor according to claim 2, wherein at least one second gap is situated between loop parts of a hinge loop, and said second gaps are smaller than said first gaps.

5. A conveyor according to claim 2, wherein at least a number of second gaps are formed by grooves or recesses in the hinge loop which are accessible from the underside of the module.

6. A conveyor according to claim 2, wherein at least a number of second gaps are situated between hinge loops of two modules that are adjacent to each other transversely to the conveying direction.

7. A conveyor according to claim 2, wherein at least a number of the second gaps are situated between hinge loops of modules successive in conveying direction which cooperate via a hinge pin.

8. A conveyor, comprising a modular conveyor mat driven by at least one sprocket wheel, wherein the modular conveyor mat comprises:

a number of modules successive in a conveying direction, which are each provided with a body part extending transversely to the conveying direction and having rows of hinge loops respectively reaching forward and rearward in the conveying direction, the hinge loops being spaced apart transversely to the conveying direction defining first gaps therebetween, wherein the hinge loops of successive modules cooperate and are coupled using hinge pins, and wherein the conveyor mat is driven by the sprocket wheel on the hinge pins, at least one of said hinge loops including a groove forming loop parts defining a second gap therebetween, wherein a tooth of the sprocket engages one of said hinge pins in said second gap to drive the conveyor mat.

9. A conveyor according to claim 1, in which said modules are successive in a conveying direction.

* * * * *